Patented Aug. 17, 1926.

1,596,651

UNITED STATES PATENT OFFICE.

LESTER F. BRYANT, OF OAK PARK, ILLINOIS.

EMOLLIENT ANTISEPTIC COMPOSITION.

No Drawing. Application filed February 15, 1926. Serial No. 88,477.

The present invention relates to improvements in emollient antiseptic compositions and will be fully understood from the following description thereof, in which specific examples of compositions embodying the present invention are folly set forth.

It has been known hitherto to employ emollient antiseptic compositions for the treatment of the mucous membrane of the nose, throat and of other portions of the body, such emollient compositions consisting of an oily vehicle combined with (in solution or absorbed) iodine and phenol. In the use of such compositions, to secure a desired remedial antiseptic action, it has hitherto been necessary to use proportions of phenol and iodine amounting to 2% or higher and with such preparations continued use tends to cause irritations of the mucous membrane which ultimately may become of serious character.

I have found that, in compositions of this character as hitherto used, substantially the entire antiseptic action is due to the phenol present, and that the phenol alone is transferred in any substantial quantity to the aqueous fluids present and those constituting the substance of the cells of the mucous membrane. The iodine present has substantially no antiseptic or bactericidal effect, it is believed, since my experiments show that substantially none of it is transferred to an aqueous liquid in contact with the emollient composition as hitherto employed.

I have now found that by incorporating into a suitable oily vehicle, in addition to phenol and iodine, small proportions of thymol, the partition ratio of the iodine with respect to aqueous liquids is greatly changed, and a large proportion thereof is transferred to aqueous liquids in contact with the oily vehicle containing the iodine associated with phenol and thymol. As a result of my discovery, I have found that, when thymol is incorporated in the emollient composition as above set forth, the proportions of phenol and iodine may be very substantially reduced while securing as great or an even greater remedial antiseptic action and at the same time the reduction of the proportions of these constituents renders the composition much less irritating or substantially non-irritating and permits of its continued application to a mucous membrane without giving rise to irritations or disturbances thereof. Thus, I have found that a satisfactory emollient composition may be prepared by incorporating into a suitable oily vehicle, as U. S. P. petrolatum oil, from 0.05 to 0.15% of iodine; from 0.5 to 0.7% of phenol and from 0.02 to 0.07% of thymol. A suitable specific composition falling within these ranges is one containing in a petrolatum oil vehicle 0.08% iodine, 0.6% phenol and 0.04% thymol. Such a composition is non-irritating even to the most sensitive mucous membrane when repeatedly applied thereto and has a highly remedial antiseptic action, for example, in nasal infections.

It is highly effective in inhibiting and destroying bacteria such as pneumococcus, streptococcus and staphylococcus. Thus, when placed in contact with a culture of such bacteria (for instance a blood-agar culture), pneumococcus is inhibited by 5 minutes exposure and destroyed by 15 minutes exposure; streptococcus is strongly inhibited by 15 minutes exposure and destroyed by 30 minutes exposure; and staphylococcus is inhibited by 30 minutes exposure and killed by 60 minutes exposure.

Although I have set forth a preferred range of the proportions of the constituents of the composition, my invention is not limited thereto, as highly desirable effects may be secured by the addition of small amounts of thymol, say up to .1%, to the stronger iodine-phenol-oil compositions as now commonly employed. As pointed out hereinbefore, with the present invention the proportions of phenol and iodine hitherto used are unnecessarily large and I therefore prefer the smaller proportions as above specifically set forth.

I claim:—

1. An emollient antiseptic solution comprising an oily vehicle, iodine, phenol and thymol.

2. An emollient antiseptic composition comprising an oily vehicle, from 0.05% to 0.15% iodine, from 0.5 to 0.7% phenol and from 0.02 to 0.07% thymol.

3. An emollient antiseptic composition comprising petrolatum oil, 0.08% iodine, 0.06% phenol and 0.04% thymol.

4. The method of improving the transfer of iodine from an oily vehicle to an aqueous fluid in the presence of phenol, which comprises adding thymol to said oily vehicle.

LESTER F. BRYANT.